US010568175B2

(12) United States Patent
Chen et al.

(10) Patent No.: US 10,568,175 B2
(45) Date of Patent: Feb. 18, 2020

(54) LIGHT CONTROL SYSTEM BASED ON DISPLAY DEVICE AND LIGHT CONTROL METHOD THEREOF

(71) Applicant: COOLER MASTER TECHNOLOGY INC., New Taipei (TW)

(72) Inventors: Chien-Lung Chen, New Taipei (TW); Pu-Shih Lu, New Taipei (TW); Kuei-Yun Feng, New Taipei (TW)

(73) Assignee: COOLER MASTER TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/990,299

(22) Filed: May 25, 2018

(65) Prior Publication Data

US 2018/0368230 A1 Dec. 20, 2018

Related U.S. Application Data

(60) Provisional application No. 62/511,873, filed on May 26, 2017.

(51) Int. Cl.
*H05B 33/08* (2006.01)
*H05B 37/02* (2006.01)
*G06K 9/00* (2006.01)

(52) U.S. Cl.
CPC ..... *H05B 33/0854* (2013.01); *G06K 9/00624* (2013.01); *H05B 33/086* (2013.01); (Continued)

(58) Field of Classification Search
CPC ............ H05B 33/0815; H05B 33/0845; H05B 33/089; H05B 33/0812; H05B 33/083; (Continued)

(56) References Cited

U.S. PATENT DOCUMENTS 7,228,190 B2 * 6/2007 Dowling ................ A63J 17/00 340/815.46
7,809,448 B2 * 10/2010 Lys ...................... H05B 37/029 315/297
(Continued)

OTHER PUBLICATIONS

[Author unknown], "A Digital Video Primer ___ Computer Vision and Multimedia Lab", Mar. 15, 2004 (Year: 2004).*
Color Kinetics, "ColorPlay 3 Version 2.5.1 User Guide", Dec. 3, 2008 (Year: 2008).*

*Primary Examiner* — Tung X Le
*Assistant Examiner* — Borna Alaeddini
(74) *Attorney, Agent, or Firm* — Maschoff Brennan

(57) ABSTRACT

A light control system comprises a power connecting port, a host connecting port, a first light connecting port, a second light connecting port, a microcontroller and a power distribution unit. The power connecting port electrically connects to an external power source to provide the power to drive a plurality of light devices. The host connecting port is configured to receive a multimedia signal from a host. The first light connecting port and the second light connecting port electrically connect to a first light device and a second light device respectively. The microcontroller is configured to identify device types and generate two dimming signals according to configurations corresponding to the device types and the multimedia signal. The power distribution unit converts the two dimming signals to two driving signals for controlling the first light device and the second light device to emit colored lights associated with the multimedia signals.

48 Claims, 9 Drawing Sheets

(52) U.S. Cl.
CPC ..... *H05B 33/0821* (2013.01); *H05B 37/0227* (2013.01); *H05B 37/0236* (2013.01); *H05B 37/0272* (2013.01)

(58) Field of Classification Search
CPC ............ H05B 33/0851; H05B 33/0818; H05B 33/0827; H05B 33/0887; H05B 33/0848; H05B 33/0809; H05B 33/0842; H05B 33/0857; H05B 33/0896; H05B 33/0824; H05B 33/0884; H05B 33/0854; H05B 33/08; H05B 33/0803; H05B 33/0806; H05B 33/0821; H05B 33/086; H05B 33/0866; H05B 33/0872; H05B 33/0893; H05B 37/02; H05B 37/0227; H05B 37/0209; H05B 37/0272; H05B 37/0245; H05B 37/0263; H05B 37/0281; H05B 37/0218; H05B 37/03; H05B 37/04; H05B 37/0254; H05B 37/029; H05B 37/00
See application file for complete search history.

(56) References Cited

U.S. PATENT DOCUMENTS

| | | | | |
|---|---|---|---|---|
| 2005/0116667 | A1* | 6/2005 | Mueller .................. | E04F 13/08 315/312 |
| 2010/0027281 | A1* | 2/2010 | Waters ................... | B64D 47/06 362/470 |
| 2016/0219679 | A1* | 7/2016 | Snyder ............... | H05B 33/0815 |
| 2016/0330825 | A1* | 11/2016 | Recker ............... | H05B 37/0272 |
| 2018/0206312 | A1* | 7/2018 | Aliakseyeu ........ | H05B 37/0245 |

* cited by examiner

LIGHT CONTROL SYSTEM BASED ON DISPLAY DEVICE AND LIGHT CONTROL METHOD THEREOF

CROSS-REFERENCE TO RELATED APPLICATIONS

This non-provisional application claims priority under 35 U.S.C. § 119(a) on Patent Application No. 62/511,873 filed in the U.S. on May 26, 2017, the entire contents of which are hereby incorporated by reference.

TECHNICAL FIELD

This disclosure relates to a light control system and a light control method, particularly a light control system that can dynamically adjust the color of the light and the method thereof.

RELATED ART

With the rise of eSports, in addition to enhancing the performance of various hardware, high-level gaming computers also adding a rich lighting presentation to enhance the user experience. For example, the LED (Light-Emitting Diode) strips that emit single or multiple colors of light are installed on the case, the motherboard, the display card, the memory, the fan, the keyboard, the mouse, or even the power supply. It is expected that the illuminating devices installed in different positions will give the user a more beautiful visual experience and enhance the atmosphere when the user plays the game.

However, the lighting accessories disposed on the periphery of the host computer may come from different manufacturers. In other words, the light control methods of different manufacturers are usually different. Therefore, if the user assembles a custom-built computer by himself, the user often faces an embarrassing situation, the color lights emitted by the light devices at each position lacks coordination or consistency, and cannot achieve the extension effect of the situational light of the current display screen. On the contrary, it may become a burden of visual fatigue, resulting in a poor user experience. Although the gaming computer suit can use the motherboard or the chassis with the same specification of the light control interface, this type of product is often expensive. Once one of the light device is damaged, the lighting component that user replaces by himself usually cannot work with the original lighting system, thus causing a lot of inconveniences.

As described above, currently there is no light control system that can be applied to a variety of light devices. Based on the audio and video signals provided by the host, or based on display devices (such as computer screen, television screen), the light control system can control the light devices installed in different positions to emit colored lights that are corresponding to the multimedia signal or the display screens, giving the user a complete situational lighting experience.

SUMMARY

In view of the above, the present disclosure proposes a light control system and a light control method, thereby integrating various types of light devices connecting to the personal computer, so that the illumination effect of the external light device is consistent and coordinated with the color of the display screen. Therefore, the visual aesthetic around the computer is increased, and the immersion of the user when playing the game is improved.

According to one or more embodiments of this disclosure, a light control system configured to electrically connect a host and a plurality of light devices, wherein the host electrically connects to a display device, and the display device displays a multimedia signal transmitted by the host, with the light control system comprising: a power connecting port electrically connecting to an external power source and adapted for providing a power to drive the plurality of light devices; a host connecting port having a communication connection with the host and adapted for receiving the multimedia signal; a first light connecting port adapted for electrically connecting to a first light device; a second light connecting port adapted for electrically connecting to a second light device; a microcontroller electrically connecting to the host connecting port, the first light connecting port, and the second light connecting port, wherein the microcontroller is configured to identify a device type of each of the first and the second light devices, obtain two configurations according to the two device types, and generate two dimming signals according to the two configurations and the multimedia signal, with two configurations corresponding to the two device types respectively; and a power distribution unit electrically connecting to the power connecting port, the first light connecting port, the second light connecting port, and the microcontroller, wherein the power distribution unit converts the two dimming signal to two driving signals configured to control the first light device and the second light device to emit colored lights associated with the multimedia signal.

According to one or more embodiments of this disclosure, a light control method for controlling a first light device and a second light device that electrically connects to a light control system, with the light control method comprising: identifying a device type of each of the first and second light devices by a microcontroller of the light control system and obtaining two configurations according to the two device types, with the two configurations corresponding to the two device types respectively; receiving a multimedia signal by a host connecting port of the light control system;

generating two dimming signals according to the two configurations and the multimedia signal by the microcontroller; converting the two dimming signals to two driving signals respectively by a power distribution unit of the light control system; and outputting a driving signal respectively by a first light connecting port and a second light connecting port of the light control system for controlling the first light device connected by the first light connecting port and the second light device connected by the second light connecting port to emit colored lights associated with the multimedia signal.

According to one or more embodiments of this disclosure, a light control system, comprising: a power connecting port electrically connecting to an external power source and adapted for providing a power to drive the plurality of light devices; a first light connecting port adapted for electrically connecting to a first light device; a second light connecting port adapted for electrically connecting to a second light device; a camera device taking an observation image and the observation image includes the two light devices and a display screen, wherein the display screen is a display device displaying a video signal transmitted by a host; a microcontroller electrically connecting to the camera device, wherein the microcontroller is configured to perform an image recognition procedure according to the observation image, wherein the image recognition procedure is configured to obtain positions of the two light devices and the display screen, and the microcontroller further generates two dimming signals according to the two positions and the display screen; and a power distribution unit electrically connecting to the power connecting port, the first light connecting port, the second light connecting port, and the microcontroller, wherein the power distribution unit converts the two dimming signal to two driving signals configured to control the first light device and the second light device to emit colored lights associated with the display screen.

According to one or more embodiments of this disclosure, a light control method configured to electrically connect a first light device and a second light device of a light control system, with the light control method comprising: taking an observation image by a camera device of the light control system, wherein the observation image includes the two light devices and a display screen, and the display screen is a display device displaying a video signal transmitted by a host; performing an image recognition procedure to obtain positions of the two light devices and the display screen by the microcontroller; generating two dimming signals according to the two positions and the display screen by the microcontroller; converting the two dimming signals to two driving signals by a power distribution unit of the light control system; and outputting the two driving signals by a first light connecting port and a second light connecting port of the light control system for controlling the first light device connected by the first light connecting port and the second light device connected by the second light connecting port to emit colored lights associated with the display screen.

According to one or more embodiments of this disclosure, a light control system configured to electrically connect a host and a plurality of light devices, wherein the host electrically connects to a display device, and the display device displays a multimedia signal transmitted by the host, with the light control system comprising: a power connecting port electrically connecting to an external power source and adapted for providing a power to drive the plurality of light devices; a host connecting port having a communication connection with the host and adapted for receiving the multimedia signal; a first light connecting port adapted for electrically connecting to a first light device; a second light connecting port adapted for electrically connecting to a second light device; three position sensors respectively installed close to the first light device, the second light device, and the display device, wherein the three position sensors send positions of their own; a microcontroller electrically connecting to the host connecting port and having communication connections with the three position sensors, wherein the microcontroller is configured to perform a position detecting procedure to obtain the three positions sent by the three position sensors and generate the two dimming signals according to the three positions and the multimedia signal; and a power distribution unit electrically connecting to the power connecting port, the first light connecting port, the second light connecting port, and the microcontroller, wherein the power distribution unit converts the two dimming signal to two driving signals configured to control the first light device and the second light device to emit colored lights associated with the multimedia signal.

According to one or more embodiments of this disclosure, a light control method, configured to a first light device and a second light device that electrically connects to a light control system, with the light control method comprising: performing a position detecting procedure by a microcontroller of the light control system to obtain three positions of the three position sensors that are respectively close to the first light device, the second light device, and a display device; receiving a multimedia signal by a host connecting port of the light control system; generating two dimming signals according to the three positions and the multimedia signal by the microcontroller; converting the two dimming signals to two driving signals respectively by a power distribution unit of the light control system; and outputting the two driving signals respectively by a first light connecting port and a second light connecting port of the light control system for controlling the first light device connected by the first light connecting port and the second light device connected by the second light connecting port to emit colored lights associated with the multimedia signal.

With the above architecture, the light control system and method thereof proposed in the present disclosure integrate the light devices around the computer, such as a keyboard backlight module, a mouse backlight module, a display card or a light-emitting module inside the host computer, even the stage lights can be connected to the light control system of the present disclosure. Further, the light control system proposed in the present disclosure can be used in various application fields such as mood lighting, home lighting, and stage lighting. In addition, the configuration file for controlling the lighting can be stored in the microcontroller, the computer or the cloud server, so that the same lighting configuration can be used in different places, thus improving the portability of the light control system described in the present disclosure. The user's entertainment experience can be enhanced through the light control system of the present disclosure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In the following, three embodiments of the light control system of the present disclosure will be described sequentially, together with their corresponding light control method. In the first embodiment, the light control system uses the corresponding configuration based on different types of the light devices and controls the light device to emit colored light according to the multimedia signal sent from the host. In the second embodiment, the light control system uses the camera device to obtain the positions of light devices and the display screen of the display device and controls the light devices to emit colored lights according to the positions of the light devices and the display screen. In the third embodiment, the light control system uses the position sensors to obtain the position of light devices and controls the light devices to emit colored lights according to the multimedia signal transmitted by the host and the positions of light devices.

Figure 1:
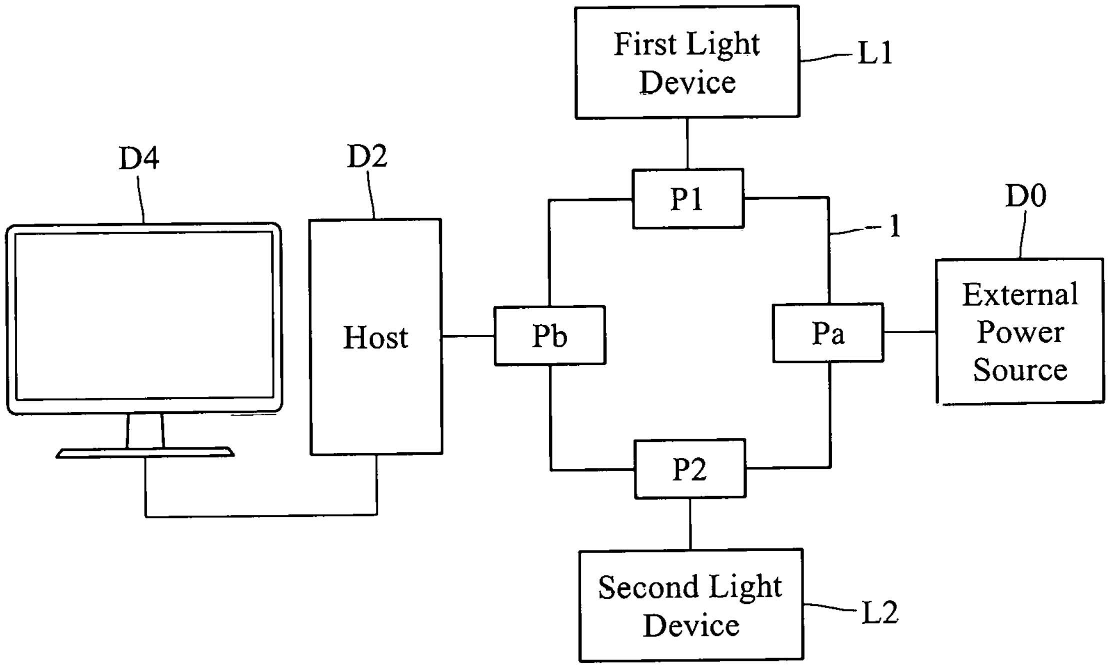
FIG. 1 is a schematic diagram of the light control system connecting external devices according to the first embodiment of the present disclosure.

Please refer to FIG. 1, which illustrates a schematic diagram of the light control system 1 connecting external devices according to the first embodiment of the present disclosure. The light control system 1 electrically connects to an external power source D0, a host D2, and a plurality of light devices L1, L2, wherein the host D2 electrically connects to a display device D4. The host D2 is, for example, a PC, a smartphone, a tablet, a server, or an STB (set-top box). If the multimedia signal can be displayed by the display device D4, the hardware devices that can transmit such kind of multimedia signal are the host D2 suitable for the light control system 1 according to the embodiment of the present disclosure. In addition, it should be noticed that the light control system 1 of the present disclosure does not limit the connecting number of the light devices. However, the first light device L1 and the second light device L2 are mainly used as an example for the convenience in the following description. In addition, when it comes to "electrical connection" in the following description, it means that two components have a path for electrical signal transmission. In practice, the electrical connection between two components can be implemented by a conducted wire or an arrangement path on a circuit board.

Figure 2A:
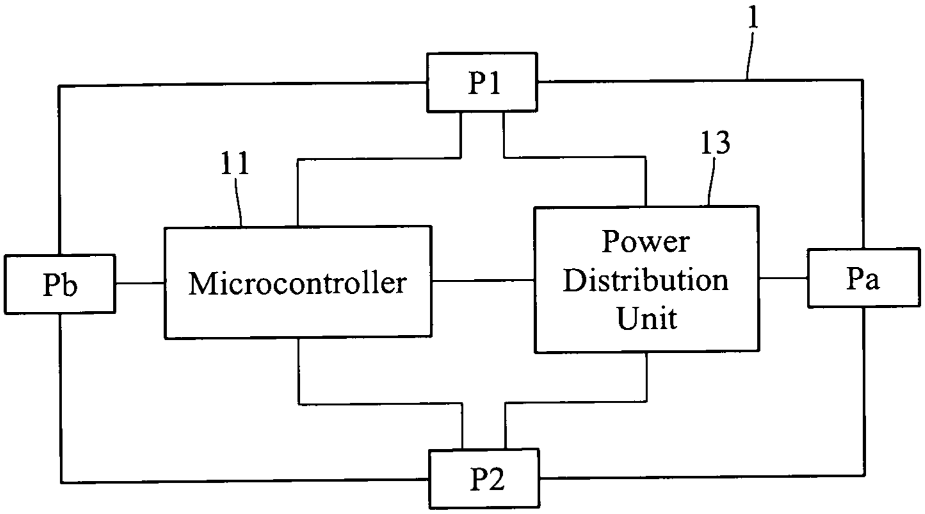
FIG. 2A is an internal architecture diagram of the light control system.

Please refer to FIG. 1 and FIG. 2A, FIG. 2A is an internal architecture diagram of the light control system 1. The light control system 1 comprises a power connecting port Pa, a host connecting port Pb, a first light connecting port P1, a second light connecting port P2, a microcontroller 11 and a power distribution unit 13.

The power connecting port Pa electrically connects to the external power source D0 and is adapted for providing a power to drive the first light device L1 and the second light device L2.

The host connecting port Pb has a communication connection with the host D2 for receiving the multimedia signal. In practice, the host connecting port Pb may use a physical wire or a wireless communication to connect to the host D2. The physical wire is such as the common used D-SUB (Subminiature), DVI (Digital Video Interface), HDMI (High Definition Multimedia Interface, HDMI) or DisplayPort. The wireless communication is such as Bluetooth, BLE, or ZigBee. The multimedia signal received by the host connecting port Pb is at least one of a video signal and an audio signal.

The first light connecting port P1 is configured to electrically connect to the first light device L1. The second light connecting port P2 is configured to electrically connect to the second light device L2. In practice, at least one of the first light connecting port P1 and the second light connecting port P2 is USB (Universal Serial Bus). In this embodiment, the first and second light device connecting port L1, L2 preferably adopts the USB, thereby the light control system 1 of the present disclosure is suitable for any light device with a USB interface. Even the light devices with other connecting interfaces, it is easy to use a USB adapter to electrically connect to the light control system 1 of the present disclosure.

The microcontroller 11 electrically connects to the host connecting port Pb, the first light connecting port P1 and the second light connecting port P2. The microcontroller 13 is configured to identify a device type of each of the first light device L1 and the second light device L2 and obtain two configurations corresponding to the two device types. In practice, after a light device electrically connects to the light control system 1, the microcontroller 11 may detect a specific pin of the light device passively, or the light device actively sends an electrical signal having its hardware identification number to the microcontroller 11. Therefore, the microcontroller 11 obtains the necessary information of the light device. In addition, the light control system 1 further comprises a storage unit (not depicted) electrically connecting to the microcontroller 11. The storage unit stores a lookup table. The lookup table is configured to record a plurality of device types and a plurality of configurations corresponding to the device types in advance. In practice, the storage unit is, for example, an EPROM (Erasable Programmable Read Only Memory), an EEPROM (Electrically Erasable Programmable Read Only Memory), or a flash memory. The present disclosure does not limit the hardware type of the storage unit. Since the lookup table is recorded in the storage unit in advance, the microcontroller 11 may compare the items in the lookup table with necessary information of the light device obtained previously one by one, thereby obtaining configurations of device types. The configuration is an electrical specification that makes the light device emit various colored lights such as the rated current value or rated voltage value. In addition, a default configuration can be written in the lookup table in advance. When the microcontroller cannot identify a device type of the light device, the microcontroller uses the default configuration and tries to control this special light device to emit a light. If there is no abnormality in the subsequent lighting of this special light device, it means that this default configuration is suitable for this special light device. Otherwise, the user can detect the abnormal state of this special light device early and make corresponding treatment. For example, add the configuration of this special light device to the lookup table.

As described above, the microcontroller 11 generates dimming signals according to the multimedia signal and configurations corresponding to the first light device L1 and the second light device L2. Specifically, the microcontroller 11 can control the first light device L1 and the second light device L2 to emit lights through the configurations. As for the color of the light, it is determined by the microcontroller 11 according to the multimedia signal. In practice, microcontroller 11 performs the corresponding processing procedure according to whether the multimedia signal received by the host connecting port Pb belongs to the video signal or the audio signal.

If the multimedia signal received by the host connecting port Pb belongs to a video signal, the microcontroller 11 performs a partition color evaluation procedure. This partition color evaluation procedure divides the video signal into one or more sub-video signals and obtains a representative color of each of the sub-video signals, and each of the sub-video signals corresponds to a partition of a display screen that the video signal displaying on display device D4 and the two dimming signals are associated with two of the representative colors. For example, microcontroller 11 regards the left half side and the right half side of the display device D4 as two partitions (the number of partitions is preset by the user). The video signal is divided into the first sub-video signal displaying on the left half side of the display device D4 and the second sub-video signal that displaying on the right half side of the display device D4, and then a mean value of trichromatic light (RGB) of all pixels in each of the two sub-video signals is calculated. Therefore, the microcontroller 11 obtains representative colors of the first and the second sub-video signals, these two representative colors are used to set the color settings of the colored lights of the two dimming signals. For example, the first light device L1 is responsible for emitting a light whose color corresponds to the representative color of the left half side, and second light device L2 is responsible for emitting a light whose color corresponds to the representative color of the right half side. It should be noticed that the number of the partitions of the above partition color evaluation procedure is not limited by the above example. For example, the display screen of the entire display device D4 can be viewed as one partition and all of the light devices collectively emit a colored light of the partition's representative color. In another example, each partition is assigned to a light device, and each light device individually emits a colored light corresponding to the partition's representative color. In addition, the number of the partition and the correspondence between partitions and the respective light devices can be preset in the storage unit of the microcontroller 11 by the user.

Figure 2B:
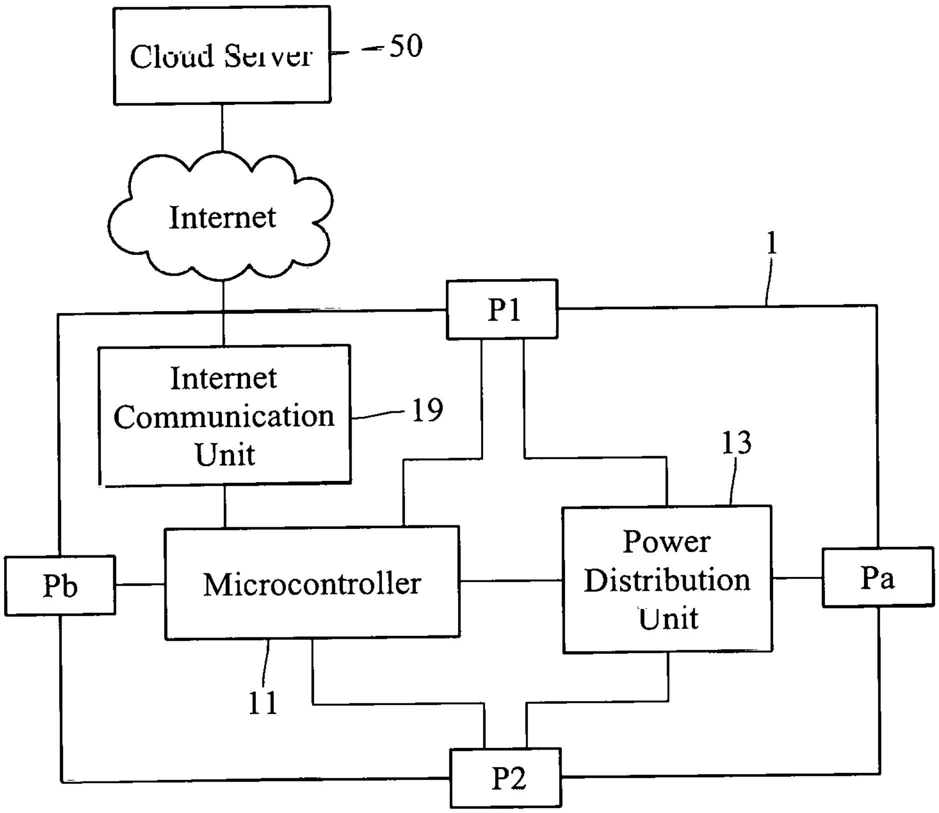
FIG. 2B is a schematic diagram of the light control system connecting external devices.

If the multimedia signal received by the host connecting port Pb belongs to an audio signal, the microcontroller 11 performs an audio feature recognition procedure. This audio feature recognition procedure generates a plurality of dimming policies according to a volume, a frequency, or a pitch of the audio signal in a time interval, each of the dimming policies comprises a light device number, a specified color and a starting time. The two dimming signals are associated with two of the dimming policies. Therefore, the microcontroller 11 may specify the light color most suitable for the audio signal in the dimming signal according to the characteristic of the current audio signal. In addition, the dimming policies may be specified by the user in advance. In an embodiment, the dimming policies set beforehand are stored in the aforementioned storage unit. Please refer to FIG. 2B, in another embodiment, the light control system 1 further comprises an internet communication unit 19 electrically connecting to the microcontroller 11. This internet communication unit 19 allows the microcontroller 11 to have a communication connection with a cloud server 50 for accessing the dimming policies as shown in FIG. 2B. Therefore, the light control system 1 of the present disclosure can achieve the portability of sharing the same dimming policy among different places or different users.

Taking an eSport game as an example, in general, the video signal and the audio signal included in a multimedia signal are mostly transmitted at the same time. Therefore, after the microcontroller 11 performs the partition color evaluation procedure and the audio feature recognition procedure at the same time, if these two procedures generates dimming signals corresponding to the same light device have a color conflict, the microcontroller 11 may selectively choose to use the representative color of the sub-video signal or the specified color of the dimming policy, and the present disclosure does not limit herein.

The power distribution unit 13 electrically connects to the power connecting port Pa, the first light connecting port P1, the second light connecting port P2 and the microcontroller 11. The power distribution unit 13 converts the two dimming signals generated by the microcontroller 11 to two driving signals respectively. The power distribution unit 13 transmits the driving signals through the first light connecting port P1 and the second light connecting port P2, thereby controlling the first light device L1 and the second light device L2 to emit colored lights associated with the multimedia signal. In practice, the power distribution unit 13 is such as a LED Driver, and the driving signals are such as PWM (Pulse Width Modulation) signal or linear current adjusting signal.

As described above, the light control system 1 according to the first embodiment of the present disclosure can detect the device types of the light devices connecting to the first and second light connecting ports P1, P2, obtain the configurations corresponding to the device types, and perform the partition color evaluation procedure and/or the audio feature recognition procedure according to the video signal and the audio signal receiving from the host connecting port Pb, thus obtaining the representative color of the sub-video signal and the specified color sufficient to represent the audio signal. The microcontroller 11 generates two dimming signals according to the two configurations, the representative colors and/or the specified colors. The two dimming signals are converted to two driving signals by the power distribution unit 13. The two driving signals are respectively transmitted to the first light device L1 and the second light device L2 through the first light connecting port P1 and the second light connecting port P2. Therefore, the effect of controlling different types of light devices based on the multimedia signal to emit appropriate lighting colors can be achieved.

Figure 3:
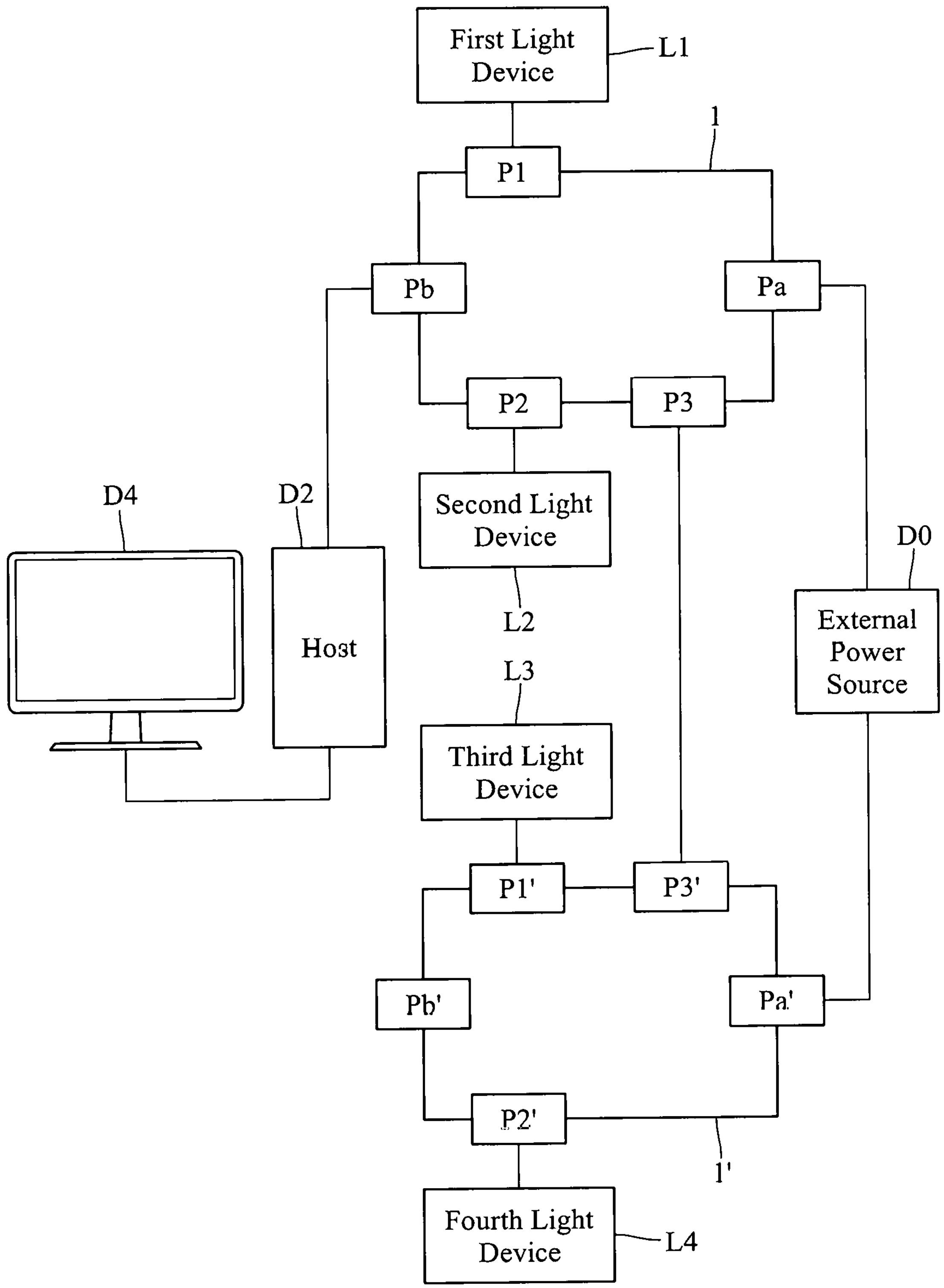
FIG. 3 is a schematic diagram of the expansion connection of the light control system of the present disclosure.
Figure 4:
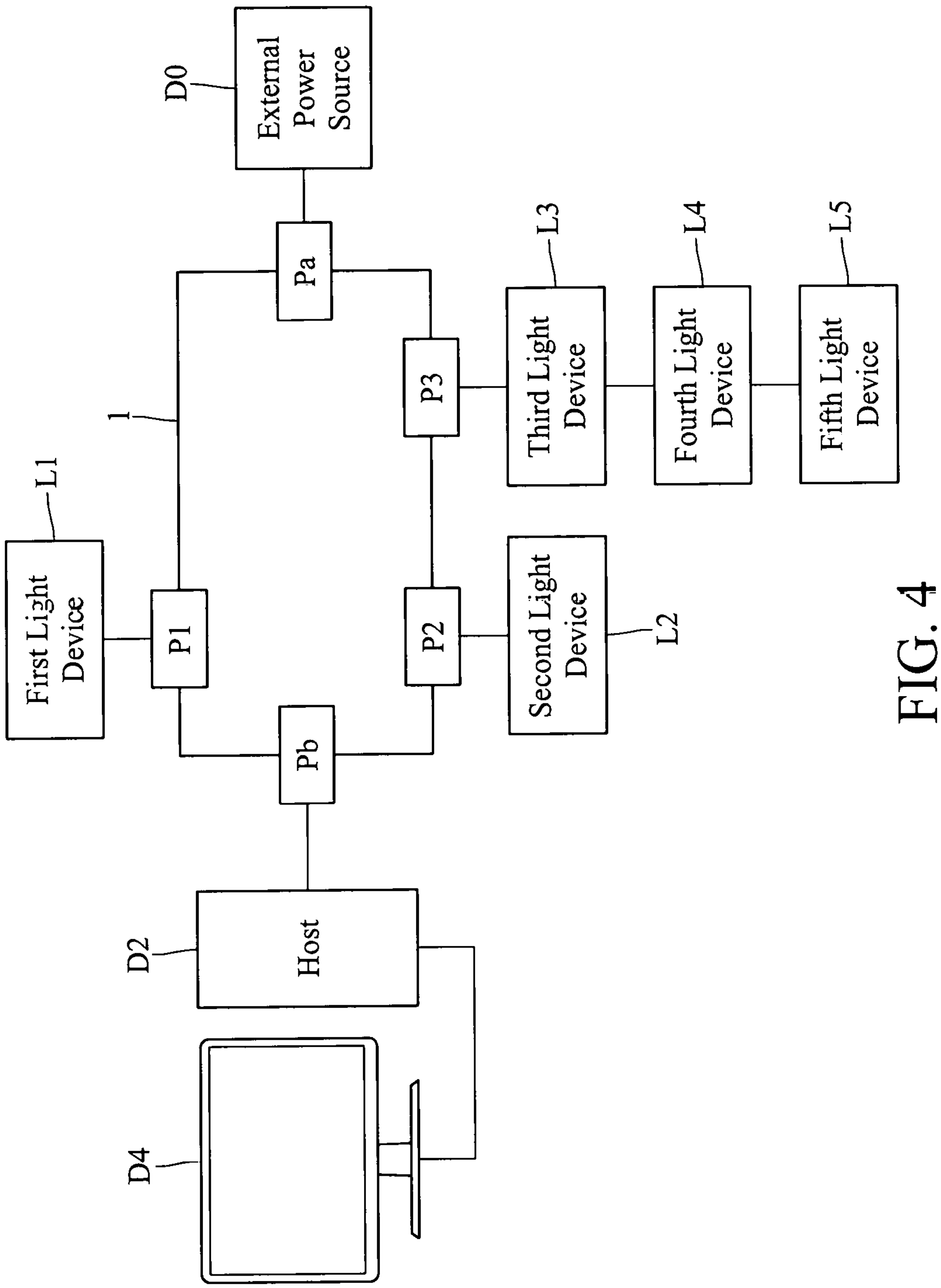
FIG. 4 is a schematic diagram of the light control system connecting multiple light devices.

Please refer to FIG. 3 and FIG. 4. FIG. 3 illustrates a schematic diagram of the expansion connection of the light control system 1 of the present disclosure. FIG. 4 illustrates a schematic diagram of the light control system 1 connecting multiple light devices. The light control system 1 of the present disclosure further comprises a third light connecting port P3 and the connection manner is similar to that of the first light connecting port P1 and the second light connecting port P2 described above. The third light connecting port P3 electrically connects to the microcontroller 11 and the power distribution unit 13 with DMX 512 (Digital Multiplex) communication protocol. DMX 512 is a widely used communication protocol for professional stage lighting control, and the data transmission of DMX 512 can be implemented through the USB interface. FIG. 3 illustrates the way to connect a light control system 1 with another light control system 1' using a daisy-chain. Specifically, both the third light connecting ports P3 and P3' shown in FIG. 3 comprises two interfaces, DMX-IN and DMX-OUT. In practice, the DMX-OUT of the third light connecting port P3 of the light control system 1 originally connected to the host D2 is electrically connected to the DMX-IN of the third light connecting port P3' of the light control system 1' as an extension, and the expansion architecture is achieved as shown in FIG. 3. Please refer to FIG. 4. In practice, a plurality of stage lights can be connected to the third light connecting port P3 in series according to the characteristic of DMX 512 protocol, like the connections of the third light device L3, the fourth light device L4, and the fifth light device L5 as shown in FIG. 4. As described above, the light control system 1 of the present disclosure can externally connect to a sufficient number of light devices as the expansion manner shown in FIG. 3 and FIG. 4, and the number of connecting ports does not limit by the number of the light connecting ports.

Figure 5:
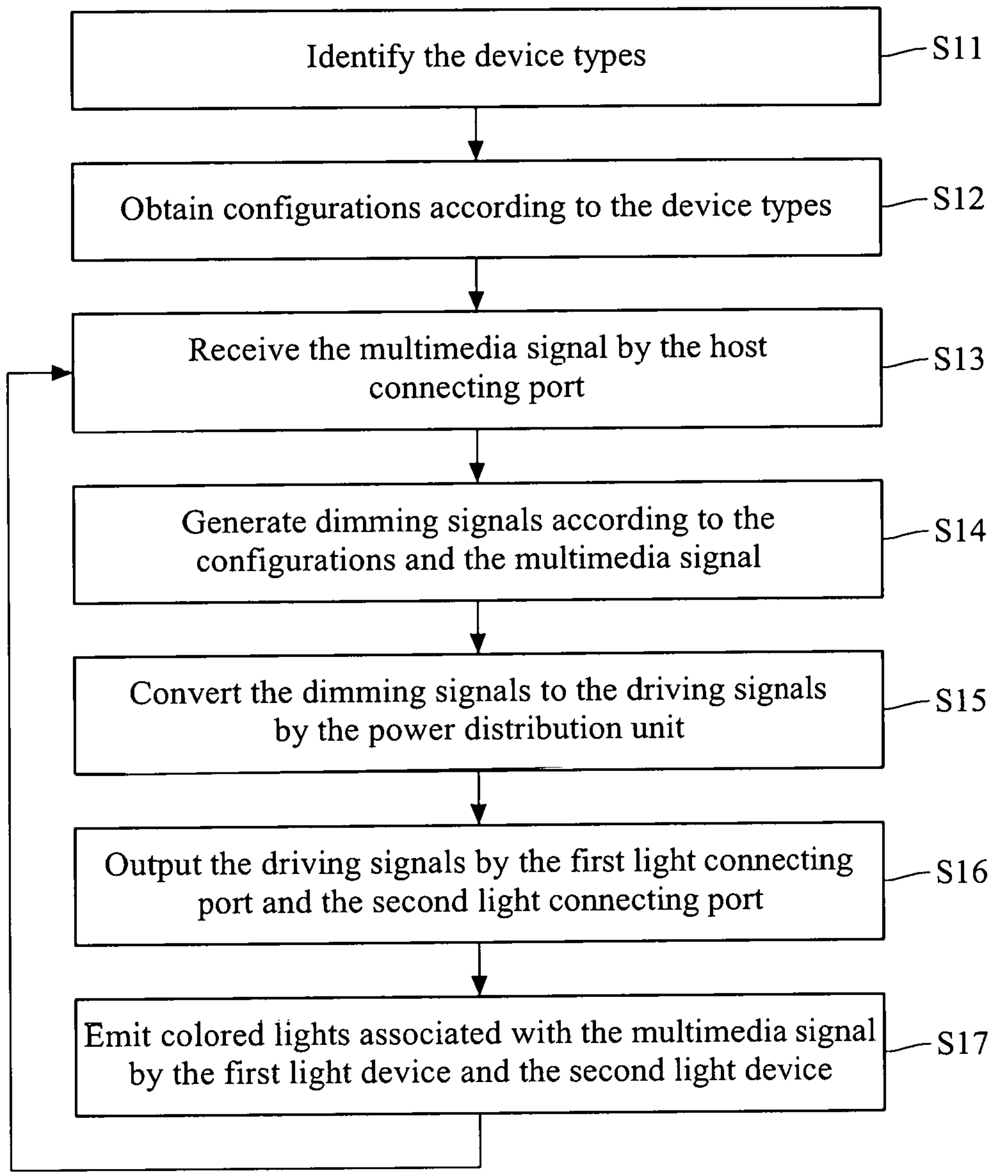
FIG. 5 is a flowchart of the light control method according to the first embodiment of the present disclosure.

Please refer to FIG. 5, which illustrates a flowchart of the light control method according to the first embodiment of the present disclosure. Please refer to S11. After the first light device L1 and the second light device L2 have been electrically connected to the light control system 1 of the present disclosure, the microcontroller 11 instantly identifies the device type, and accesses the lookup table from the storage unit to perform step S12, "obtaining the corresponding configurations according to device types" by the microcontroller 11. It should be noticed that if the microcontroller 11 cannot identify the device type of any one of the two light devices L1, L2, the microcontroller 11 selects a default configuration as the configuration of the unidentified light device. Please refer to step S13, the host connecting port Pb receives the multimedia signal from the host D2. Please refer to step S14, the microcontroller 11 generates dimming signals according to configurations and the multimedia signal. For example, the microcontroller 11 performs the partition color evaluation procedure according to the video signal or performs the audio feature recognition procedure according to the audio signal. It should be noticed that the dimming policies generated by the microcontroller 11 during the audio feature recognition procedure can be pre-written into the storage unit of the light control system 1 before step S11. Alternatively, the required dimming policies can be downloaded from a cloud server 50 by the internet communication unit 19 for use in step S14. Please refer to step S15, the power distribution unit 13 converts the dimming signals to the driving signals. Please refer to step S16, the power distribution unit 13 outputs the driving signals to the first light device L1 and the second light device L2 through the first light connecting port P1 and the second light connecting port P2, so that the first light device L1 and the second light device L2 can emit colored lights associated with the multimedia signal. Please refer to step S17, in practice, the display device D4 continuously displays the multimedia signal transmitted by the host D2, so the host connecting port Pb keeps receiving this multimedia signal. Therefore, after the step S17 is performed, the light control method according to the first embodiment of the present disclosure immediately returns to step S13, so that the microcontroller 11 can generate the dimming signal according to the new multimedia signal in real time, and the light control system 1 adjusts the light colors emitted by the light devices to match up the representative colors corresponding to partitions of the display screen.

Figure 6:
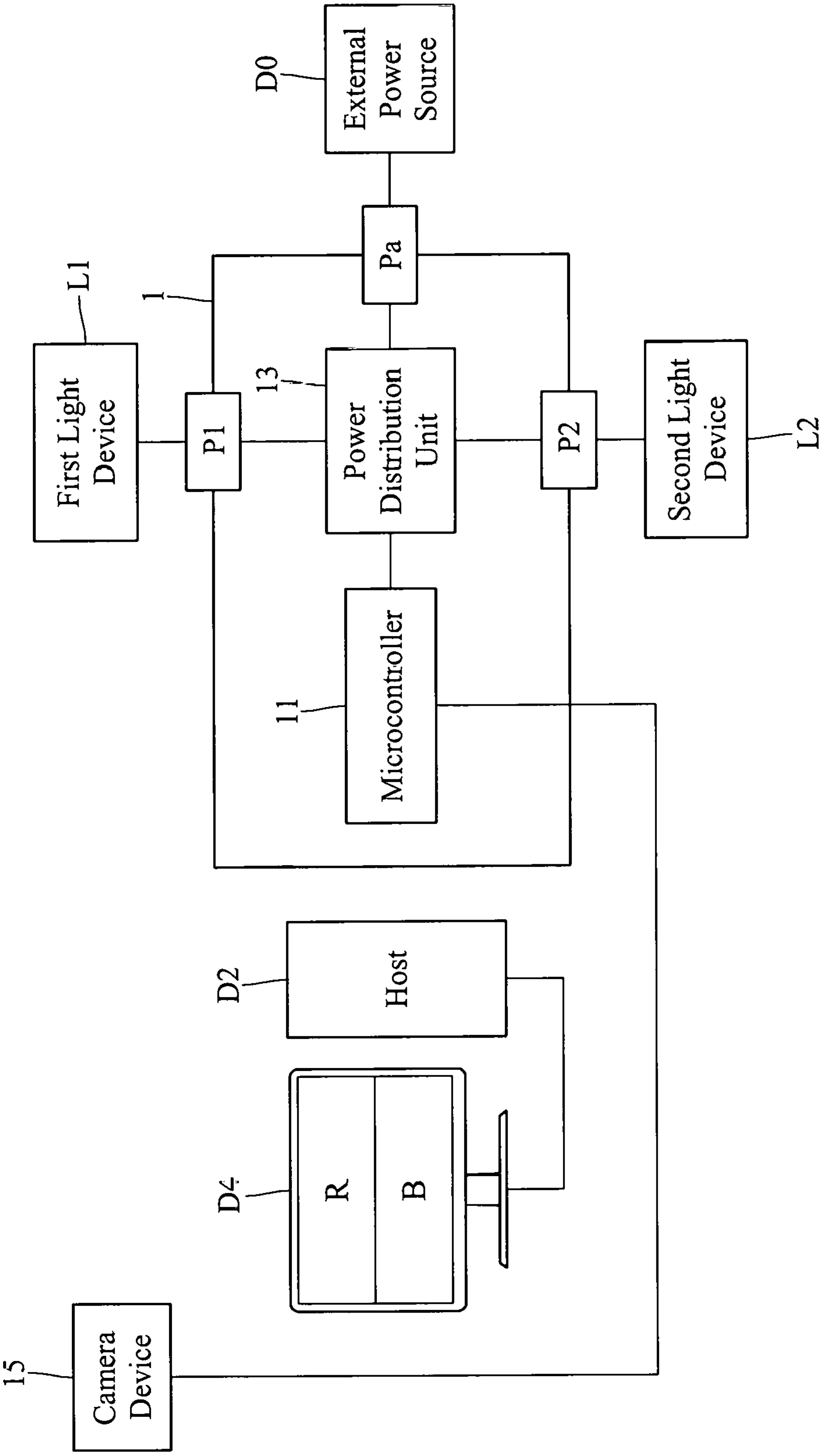
FIG. 6 is a schematic diagram showing the internal architecture of the light control system and the connection of the external devices according to the second embodiment of the present disclosure.

Please refer to FIG. 6, which is a schematic diagram showing the internal architecture of the light control system 1 and the connection of the external devices according to the second embodiment of the present disclosure. The light control system 1 comprises a power connecting port Pa, a first light connecting port P1, a second light connecting port P2, a microcontroller 11, a power distribution unit 13 and a camera device 15, wherein the connection manner and the Implementation of the components such as the power connecting port Pa, the first light connecting port P1, the second light connecting port P2, and the power distribution unit 13 are identical to those described in the first embodiment, so the second embodiment will not repeat again.

Compared to the first embodiment, the light control system 1 of the second embodiment lacks the host connecting port Pb but adds a camera device 15 as shown in FIG. 6. The camera device 15 takes an observation image which includes two light devices L1, L2 and a display screen, wherein the display screen is that the display device D4 displays the video signal transmitted from the host D2. Therefore, when the camera device is installed, it is necessary to make the lens of the camera device 15 face the display device D4 and ensure that the camera device 15 can capture all the light devices, such as the first light device L1 and the second light device L2 as shown in FIG. 6.

The microcontroller 11 electrically connects to the camera device 15. The microcontroller 11 performs an image recognition procedure according to the observation image, and this image recognition procedure is configured to obtain positions of the two light devices and a position of the display device from the observation image. The microcontroller 11 further generates two dimming signals according to the two light device positions and the display screen position.

Regarding the light device position, the image recognition procedure finds an image block matching the characteristic of the light device from the observation image. For example, a light device appearance shape or a luminous color emitted by the light device can be used as the characteristic to perform the image processing, thereby the microcontroller can obtain the position of the light device in the observation image. The microcontroller 11 further stores the relationship between the light device positions and the display device D4 position. For example, the first light device L1 is above the display device D4 while the second light device L2 is under the display device D4.

Regarding the display screen, the image recognition procedure finds an image block matching the display screen from the observation image. For example, the image block with high variation frequency in the observed image can be used as the characteristic to perform the image processing, thereby the microcontroller can obtain the display screen position in the observation image. The microcontroller 11 further performs the partition color evaluation procedure introduced in the first embodiment based on this position, thereby obtaining the representative colors of each of the partitions of the display screen. For example, the partition color evaluation procedure divides the display screen into an upper partition and a lower partition, and the representative color of the upper half partition R is red while the representative color of the lower half partition B is blue as shown in FIG. 6. The microcontroller 11 sets red, the representative color of the upper half partition R in the dimming signal used by the first light device L1, and sets blue, the representative color of the lower half partition B in the dimming signal used by the second light device L2. Therefore, after the power distribution unit 13 converts the dimming signals to driving signals and transmits the driving signals through the first and the second light connecting ports P1, P2, the first light device L1 above the display device D4 emits the red light and the second light device L2 under the display device D4 emits the blue light. The illuminating color of the light device extends the hue of the representative colors of the upper and lower partitions of the display screen to achieve a harmonious aesthetic visually.

Figure 7:
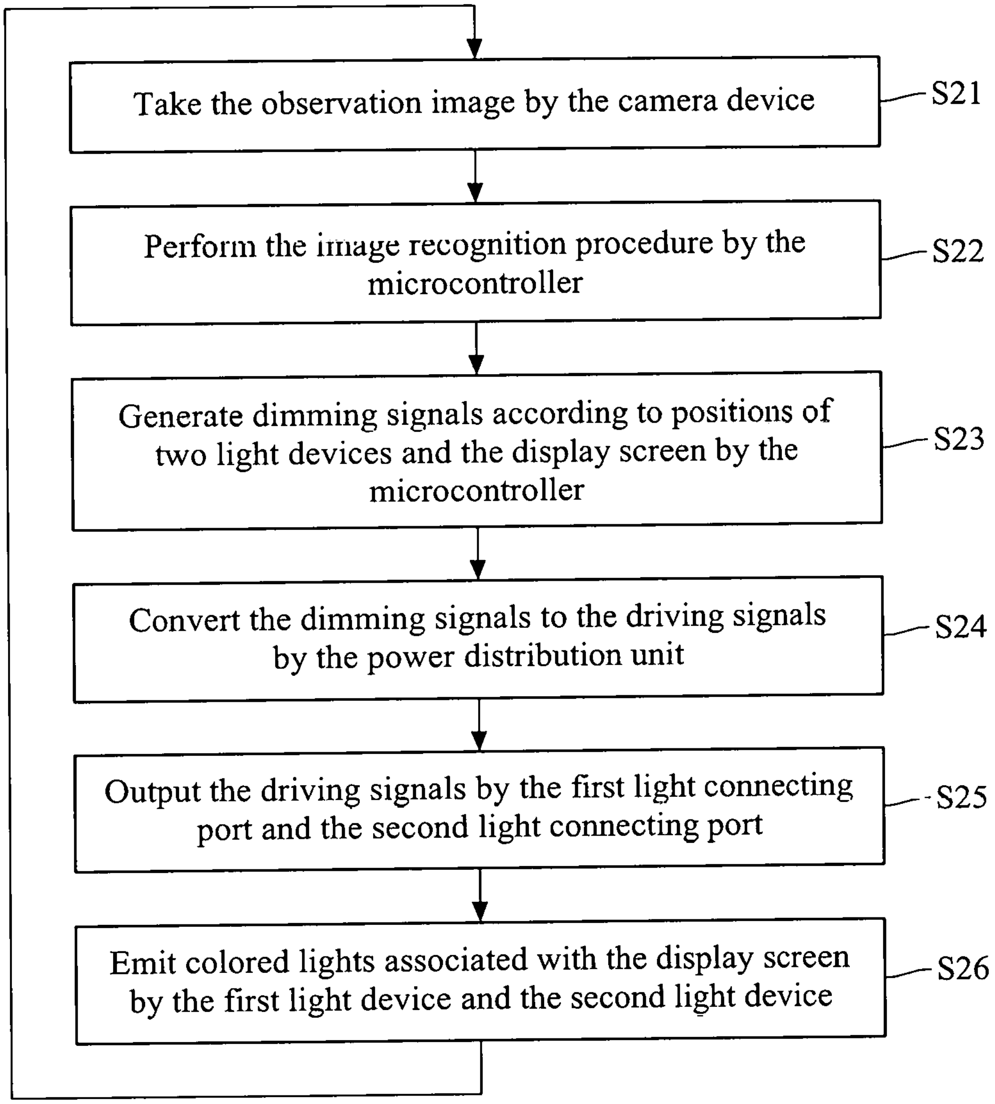
FIG. 7 is a flowchart of the light control method according to the second embodiment of the present disclosure.

Please refer to FIG. 7, which illustrates a flowchart of the light control method according to the second embodiment of the present disclosure. Please refer to step S21. In practice, before the display device D4 displays the video signal transmitted from the host D2, the camera device 15 takes the observation image, and the microcontroller 11 performs an image recognition procedure as shown in step S22. The positions of all light devices and the position of the display device D4 can be ensured by the image recognition procedure. In practice, if the microcontroller 11 cannot identify the position of any one of the two light devices L1, L2, the microcontroller 11 may choose a default position as the position of the unidentified light device. Please refer to step S23, after the host D2 starts to use the display device D4 to display the display screen, the microcontroller 11 performs the partition color evaluation procedure to obtain the representative colors of partitions according to the image blocks belonging to the display screen in the observation image. The microcontroller 11 generates the dimming signals according to the representative color described above and the light device position recorded in step S22. Specifically, the light device has a corresponding relationship with respect to the position if the display device D4 and the display screen, and the microcontroller 11 sets the color in the dimming signal of each light device based on this corresponding relationship. Please refer to step S24, the power distribution unit 13 converts the dimming signals to the driving signals. The driving signals are, for example, PWM signals or linear current adjusting signals introduced in the first embodiment. Please refer to step S25, the first light connecting port P1 and the second light connecting port P2 output the driving signals. Please refer to step S26, the first light device L1 connecting to the first light connecting port P1 and the second light device L2 connecting to the second light connecting port P2 emit colored lights associated with the display screen. Specifically, the colors of the lights emitted by the two light device L1, L2 are determined according to representative colors of the corresponding partitions of the display screen. In practice, the display device D4 continuously displays the multimedia signal transmitted by the host D2, and the luminous color of the light device needs to be adjusted according to the latest display screen. Therefore, the light control method according to the second embodiment of the present disclosure returns to step S21 immediately after the step S26 is completed, so that the camera device 15 can take a new observation image for subsequent analysis and use by the microcontroller 11. In addition, the light control method according to the second embodiment of the present disclosure can dynamically adjust the color of the light emitted by the light device and the color of the light conforms to the representative color of each partition of the display screen.

As described above, the light control system 1 and the light control method disclosed in the second embedment take the observation image by the camera device 15. The microcontroller 11 performs the image recognition procedure to obtain the light device positions and the display screen position from the observation image. The microcontroller 11 generates the dimming signals according to the different partitions of the display screen and these partitions can correspond to the real positions of the light devices. The power distribution unit 13 converts the dimming signals to the driving signals. The first light connecting port P1 and the second light connecting port P2 transmit driving signals to the first light device L1 and the second light device L2 respectively. So the light control system 1 and the light control method disclosed in the second embedment achieve the effect of emitting consistent colored light based on the representative color of each partition of the display screen.

It should be noticed that the light control system 1 of the first embodiment may add the camera device 15 as described in the second embodiment to capture all the light devices and the display device D4. However, in the first embodiment, the image recognition procedure performed by the microcontroller 11 only needs to obtain the positions of all light devices and the position of the display device D4, and there is no need to perform a partition color evaluation procedure according to the display screen in the observation image. The light control system 1 of the first embodiment can achieve the color extension effect of the display screen introduced in the second embodiment.

Figure 8:
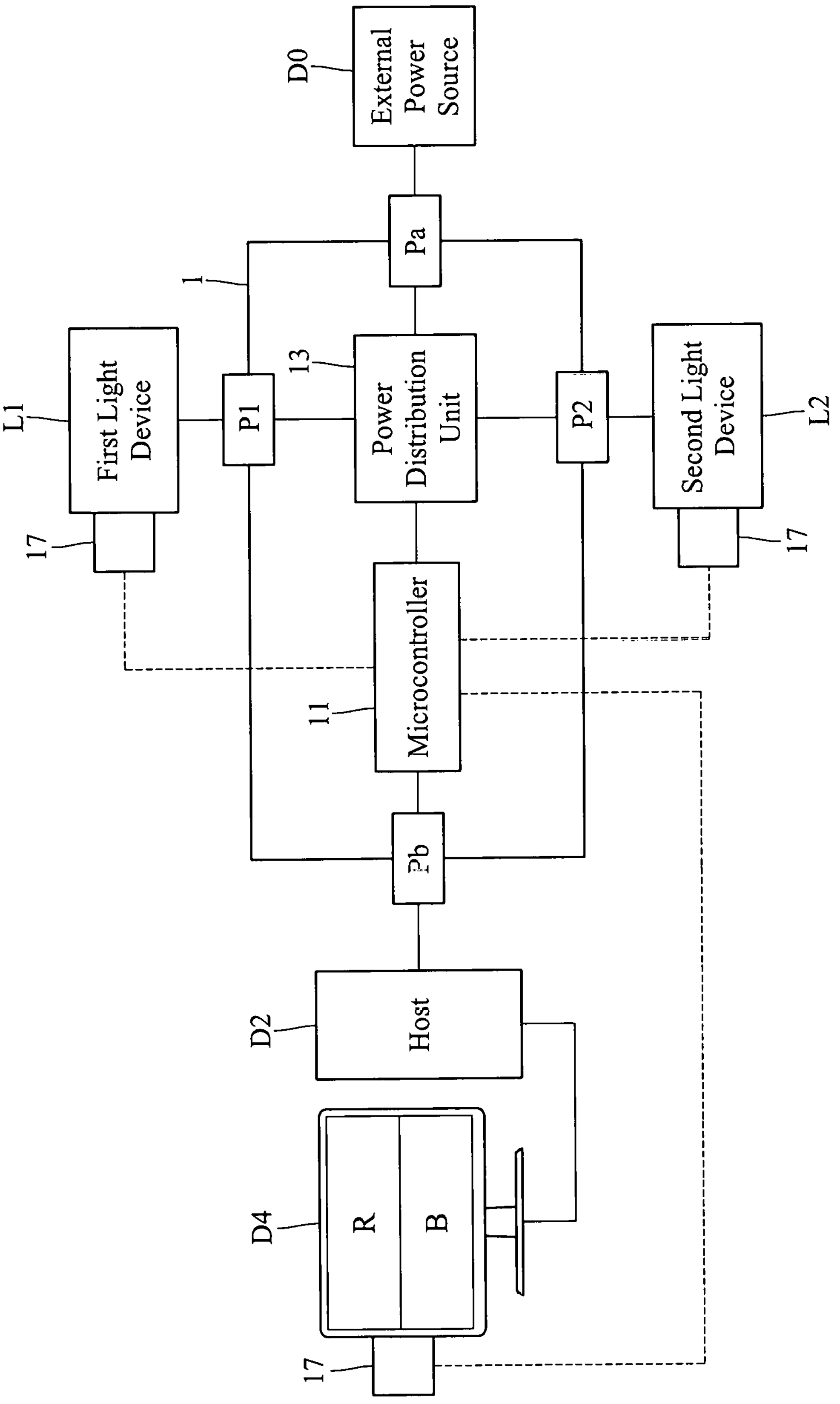
FIG. 8 is a schematic diagram showing the internal architecture of the light control system and the connection of the external devices according to the third embodiment of the present disclosure.

Please refer to FIG. 8, which is a schematic diagram showing the internal architecture of the light control system 1 and the connection of the external devices according to the third embodiment of the present disclosure. The light control system 1 comprises a power connecting port Pa, a host connecting port Pb, a first light connecting port P1, a second light connecting port P2, three position sensor 17 and a power distribution unit 13, wherein the connection manner and the implementation of the components such as the power connecting port Pa, the host connecting port Pb, the first light connecting port P1, the second light connecting port P2, and the power distribution unit 13 are identical to that described in the first embodiment, and are not be repeated in this third embodiment.

Please refer to FIG. 8. Compared to the first embodiment, the light control system 1 of the third embodiment adds three position sensors 17 respectively installing close to the first light device L1, the second light device L2, and the display device D4. These position sensors 17 are, for example, photoelectric sensors with a centimeter level of precision positioning. The position sensors 17 are used to transmit their own positions. In other words, these positions reflect the positions of the objects to which the position sensors are mounted. In addition to electrically connecting to the host connecting port Pb and the power distribution unit 13, the microcontroller 11 further have communication connections to the three position sensors 17. The microcontroller 11 is used to perform a position detecting procedure to obtain the three positions sent by the three position sensors 17. If the microcontroller 11 cannot obtain the positions of the first light device L1, the second light device L2, or the display device D4, the microcontroller 11 selects a default position as the position of the un-cognizable component. Therefore, the microcontroller 11 can obtain the relative position relationship of the first light device L1, the second light device L2 relative to the display screen. The microcontroller 11 further generates two dimming signals according to these positions and the multimedia signal. For example, as shown in FIG. 8, the microcontroller 11 knows through the position sensor 17 that the position of the first light device L1 is above the display device D4 while the position of the second light device L2 is under the display device D4. Therefore, when the microcontroller 11 performs the partition color evaluation procedure, the microcontroller 11 sets the representative color (such as red) of the upper half partition R of the display device D4 in the dimming signal of the first light device L1, and sets the representative color (such as blue) of the lower half partition B in the dimming signal of the second light device L2. Furthermore, after the power distribution unit 13 converts the dimming signals to driving signals and transmits the dimming signals through the first and second light connecting port P1, P2, the first light device L1 above the display device D4 emits the red light and the second light device L2 under the display device D4 emits the blue light. Since the luminous colors of the light devices extend the color tones of the upper and lower half partitions of the display screen representative color, it achieves a harmonious aesthetic visually.

The light control system 1 described in the third embodiment also adopts the concept of "the representative color of the partition of the display device corresponds to the real position of the light device" as described in the second embodiment, the difference is that the third embodiment directly achieves the effect of confirming the position relationship by the position sensor 17 installed in the light device L1, L2 and the display device D4. The third embodiment saves the computing resource consuming by the microcontroller 11 performing the image recognition procedure in comparison with the second embodiment. In addition, since the light control system 1 of the third embodiment comprises the host connecting port Pb configured to receive the video signal and the audio signal transmitted by the host D2, the microcontroller 11 in the third embodiment further performs the audio feature recognition procedure described in the first embodiment to obtain the dimming policies corresponding to the audio signals. As described above, the light control system 1 of the third embodiment also comprises a storage unit or an internet communication unit 19 to store the dimming policies in the host or in the cloud server 50 that described in the first embodiment. In practice, the third light connecting port can be added to connect light devices with DMX512 interface depend on the requirement.

Figure 9:
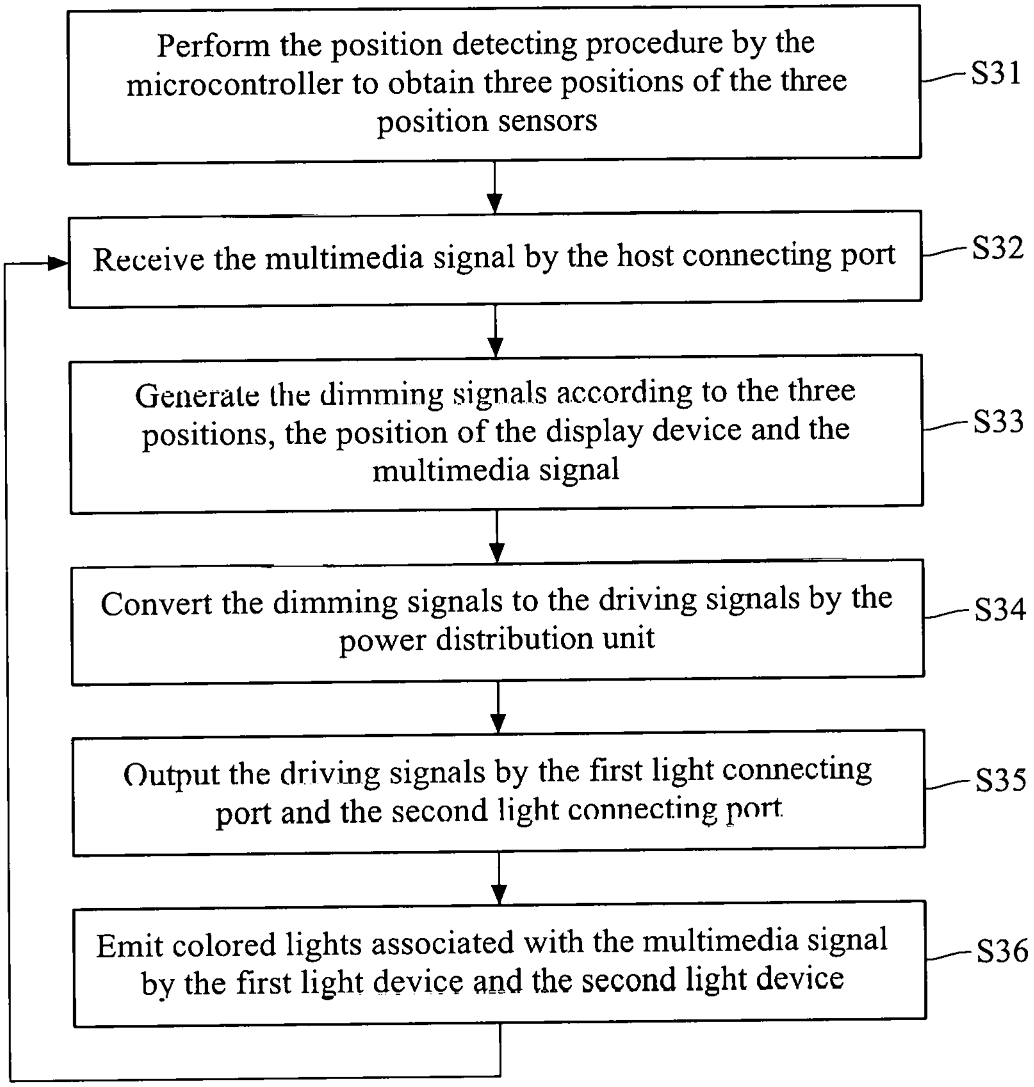
FIG. 9 is a flowchart of the light control method according to the third embodiment of the present disclosure.

Please refer to FIG. 9, which illustrates a flowchart of the light control method according to the third embodiment of the present disclosure. Please refer to step S31, the microcontroller 11 performs the position detecting procedure. In practice, after the position sensors 17 finish the installations and before the light control system 1 starts to receive multimedia signal, the microcontroller 11 detects the position relationship of the light device L1, L2 and the display device D4 in advance and stores this position relationship in the storage unit. Please refer to step S32, the host connecting port Pb receives the multimedia signal. Please refer to step S33, the microcontroller 11 generates the dimming signals according to the positions of the light device L1, L2, the position of the display device D4 position and the multimedia signal. Specifically, the microcontroller 11 performs the partition color evaluation procedure according to the video signal and performs the audio feature recognition procedure according to the audio signal. The details of the above two procedures can refer to the relevant paragraphs in the first embodiment and the details are not described herein again. However, it should be noticed that, after the microcontroller 11 obtains the representative colors of the partitions and the specified colors of the dimming policies through the above two procedures, the microcontroller sets the color corresponding to each partition of the display device D4 in the dimming signal of the light device according to the position relationship between the light device L1, L2 and the display device D4 stored in step S31. Please refer to step S34 to step S36, after the microcontroller 11 generates the dimming signals, the power distribution unit 13 converts the dimming signals to driving signals, the first light connecting port P1 and the second light connecting port P2 output the driving signals, and the first light device L1 and the second light device L2 emit the colored lights associated with the multimedia signal. In practice, the display device D4 continuously displays the multimedia signal transmitted by the host D2, and the host connecting port Pb keeps receiving this multimedia signal. Therefore, the light control method according to the third embodiment of the present disclosure returns to the step S22 immediately after the step S36 is completed, so that the microcontroller 11 can generate the dimming signal in real time according to the new multimedia signal, and adjust the luminous color of the light emitted by the light device to match the representative colors of the partitions of the display screen.

As described above, the light control system 1 and the light control method according to the third embodiment of the present disclosure are to obtain the positions of the light device L1, L2 and the display device D4 through the position sensors 17. The microcontroller 11 performs the position detecting procedure to obtain the position relationship between the light devices and the display device D4. The microcontroller 11 maps the different partitions of the display screen to the respective light devices on the actual position and assigns the color setting in the dimming signal accordingly when generating the dimming signals. The power distribution unit 13 converts the dimming signals to the driving signals. The first light connecting port P1 and the second light connecting port P2 are used to transmit the driving signals to the first light device L1 and the second light device L2. the light control system 1 and the light control method according to the third embodiment of the present disclosure achieve the effect of extending the consistent color of the light based on the representative color of each partition of the display screen.

To sum up, the light control system and the light control method of the present disclosure integrate the illuminable light devices of the peripheral of a computer, such as the keyboard backlight module, the mouse backlight module, the display card, or the light emitting module inside the host, even the stage light can be connected to the light control system. Moreover, the light control system of the present disclosure is adapted for various domains such as a mood lighting, a home lighting, and the stage lighting. In addition, the configurations used to control the illumination can be stored in a device, a computer, or a cloud server, the same lighting configuration can be used in the different places, and the portability of the light control system of the present disclosure is thus enhanced. The user's entertainment experience can be improved through the light control system of the present disclosure.

What is claimed is:

1. A light control system configured to electrically connect a host and a plurality of light devices, wherein the host electrically connects to a display device, and the display device displays a multimedia signal transmitted by the host, with the light control system comprising:

- a power connecting port electrically connecting to an external power source and adapted for providing a power to drive the plurality of light devices;
- a host connecting port having a communication connection with the host and adapted for receiving the multimedia signal;
- a first light connecting port adapted for electrically connecting to a first light device;
- a second light connecting port adapted for electrically connecting to a second light device;
- a microcontroller electrically connecting to the host connecting port, the first light connecting port, and the second light connecting port, wherein the microcontroller is configured to identify a device type of each of the first and the second light devices, obtain two configurations according to the two device types, and generate two dimming signals according to the two configurations and the multimedia signal, with two configurations corresponding to the two device types respectively; and a power distribution unit electrically connecting to the power connecting port, the first light connecting port, the second light connecting port, and the microcontroller, wherein the power distribution unit converts the two dimming signal to two driving signals configured to control the first light device and the second light device to emit colored lights associated with the multimedia signal;

wherein the multimedia signal is a video signal and the microcontroller performs a partition color evaluation procedure, wherein the partition color evaluation procedure divides the video signal into one or more sub-video signals and obtains a representative color of each of the sub-video signals, and each of the sub-video signals corresponds to a partition of a display screen that the video signal is displayed on the display device and the two dimming signals are associated with two of the representative colors.

2. The light control system according to claim 1, wherein a communication protocol of the host connecting port is Bluetooth, Bluetooth Low Energy, or ZigBee, and the host is a PC, a smartphone, a tablet, or a server.

3. The light control system according to claim 1, wherein at least one of the first light connecting port and the second light connecting port is USB.

4. The light control system according to claim 1, further comprising a third light connecting port adapted for electrically connecting to the microcontroller and the power distribution unit, wherein the third light connecting port is a digital multiplex interface, and the digital multiplex interface is for electrically connecting a stage light or another light control system.

5. The light control system according to claim 1, wherein the two driving signals are PWM signals or linear current adjusting signals.

6. The light control system according to claim 1, further comprising a storage unit electrically connecting to the microcontroller, wherein the storage unit is configured to store a lookup table, and the lookup table is configured to record a plurality of device types and a plurality of configurations corresponding to the device types in advance.

7. The light control system according to claim 1, wherein the representative color of each of the sub-video signals is a mean value of trichromatic light of all pixels in each of the sub-video signals.

8. The light control system according to claim 1, wherein the multimedia signal is an audio signal, and the microcontroller performs an audio feature recognition procedure, wherein the audio feature recognition procedure generates a plurality of dimming policies according to a volume, a frequency, or a pitch of the audio signal in a time interval and the two dimming signals are associated with the dimming policies.

9. The light control system according to claim 8, wherein each of the dimming policies comprises a light device number, a specified color and a starting time.

10. The light control system according to claim 8, further comprising a storage unit electrically connecting to the microcontroller, wherein the storage unit allows the microcontroller to access the dimming policies.

11. The light control system according to claim 8, further comprising an internet communication unit electrically connecting to the microcontroller, wherein the internet communication unit allows the microcontroller to have a communication connection with a cloud server for accessing the dimming policies.

12. The light control system according to claim 1, wherein the multimedia signal comprises a video signal and an audio signal and the microcontroller performs a partition color evaluation procedure and an audio feature recognition procedure, wherein:

the partition color evaluation procedure divides the video signal into one or more sub-video signals and obtains a representative color of each of the sub-video signals, and each of the sub-video signals corresponds to a partition of a display screen that the video signal is displayed on the display device; and the audio feature recognition procedure generates a plurality of dimming policies according to a volume, a frequency, or a pitch of the audio signal in a time interval, and each of the dimming policies comprises a light device number, a specified color and a starting time;

wherein when the representative colors are inconsistent with the specified colors of the dimming policies, the microcontroller further generates the two dimming signals according to the representative colors.

13. The light control system according to claim 1, wherein the multimedia signal comprises a video signal and an audio signal and the microcontroller performs a partition color evaluation procedure and an audio feature recognition procedure, wherein:

the partition color evaluation procedure divides the video signal into one or more sub-video signals and obtains a representative color of each of the sub-video signals, and each of the sub-video signals corresponds to a partition of a display screen that the video signal is displayed on the display device; and the audio feature recognition procedure generates a plurality of dimming policies according to a volume, a frequency, or a pitch of the audio signal in a time interval, and each of the dimming policies comprises a light device number, a specified color and a starting time;

wherein when the representative colors are inconsistent with the specified colors of the dimming policies, the microcontroller further generates the two dimming signals according to the dimming policies.

14. The light control system according to claim 1, further comprising a camera device electrically connecting to the microcontroller, wherein the camera device takes an observation image and the observation image includes the two light devices and the display device, and the microcontroller further performs an image recognition procedure according to the observation image, wherein the image recognition procedure is configured to obtain positions of the two light devices and a position of the display device from the observation image, and the microcontroller further generates the two dimming signals according to positions of the two light devices, the position of the display device, the two configurations, and the multimedia signal.

15. The light control system according to claim 1, further comprising three position sensors respectively installed close to the first light device, the second light device, and the display device, wherein the three position sensors have communication connections with the microcontroller and send positions of their own, and the microcontroller further performs a position detecting procedure, where the position detecting procedure is configured to obtain the three positions sent by the three position sensors and generate the two dimming signals according to the three positions, the two configurations, and the multimedia signal.

16. A light control method for controlling a first light device and a second light device that electrically connect to a light control system, with the light control method comprising:

identifying a device type of each of the first and second light devices by a microcontroller of the light control system and obtaining two configurations according to the two device types, with the two configurations corresponding to the two device types respectively;

receiving a multimedia signal by a host connecting port of the light control system, wherein the multimedia signal is a video signal;

dividing the video signal into one or more sub-video signals by the microcontroller, wherein each of the sub-video signals corresponds to a partition of a display screen that the video signal is displayed on a display device;

obtaining a representative color of each of the sub-video signals by the microcontroller;

generating two dimming signals by the microcontroller according to two of the representative colors and the two configurations;

converting the two dimming signals to two driving signals respectively by a power distribution unit of the light control system; and outputting a driving signal respectively by a first light connecting port and a second light connecting port of the light control system for controlling the first light device connected by the first light connecting port and the second light device connected by the second light connecting port to emit colored lights associated with the multimedia signal.

17. The light control method according to claim 16, wherein the microcontroller selects a default configuration when the microcontroller cannot identify the device type of any one of the two light devices.

18. The light control method according to claim 16, further comprising:

when the microcontroller obtaining the representative color of each of the sub-video signals, calculating a mean value of trichromatic light of all pixels in each of the sub-video signals and setting the mean value as the representative color.

19. The light control method according to claim 16, wherein the multimedia signal is an audio signal, with the light control method further comprising:

before the microcontroller generating the two dimming signals, generating a plurality of dimming policies according to a volume, a frequency, or a pitch of the audio signal in a time interval; and generating the two dimming signals according to the dimming policies and the two configurations by the microcontroller.

20. The light control method according to claim 19, further comprising:

before the host connecting port of the light control system receiving the multimedia signal, downloading the dimming policies from a cloud server by an internet communication unit of the light control system.

21. The light control method according to claim 16, wherein the multimedia signal comprises a video signal and an audio signal, with the light control method comprising:

before the microcontroller generating the two dimming signals, dividing the video signal into one or more sub-video signals by the microcontroller, wherein each of the sub-video signals corresponds to a partition of a display screen that the video signal is displayed on a display device;

obtaining a representative color of each of the sub-video signals by the microcontroller;

generating a plurality of dimming policies according to a volume, a frequency, or a pitch of the audio signal in a time interval, wherein each of the dimming policies comprises a light device number, a specified color, and a starting time; and generating the two dimming signals according to the representative colors when the representative colors are inconsistent with the specified colors of the dimming policies.

22. The light control method according to claim 16, wherein the multimedia signal comprises a video signal and an audio signal, with the light control method comprising:

before the microcontroller generating the two dimming signals, dividing the video signal into one or more sub-video signals by the microcontroller, wherein each of the sub-video signals corresponds to a partition of a display screen that the video signal is displayed on a display device;

obtaining a representative color of each of the sub-video signals by the microcontroller;

generating a plurality of dimming policies according to a volume, a frequency, or a pitch of the audio signal in a time interval, wherein each of the dimming policies comprises a light device number, a specified color, and a starting time; and generating the two dimming signals according to the dimming policies when the representative colors are inconsistent with the specified colors of the dimming policies.

23. The light control method according to claim 16, further comprising:

before the light control system receiving a multimedia signal, taking an observation image by a camera device, wherein the observation image includes the two light devices and a display device;

after the light control system receiving a multimedia signal, performing an image recognition procedure to obtain positions of the two light devices and a position of the display device from the observation image; and generating the two dimming signals by the microcontroller according to positions of the two light devices, the position of the display device, the two configurations, and the multimedia signal.

24. The light control method according to claim 16, further comprising:

before the light control system receiving a multimedia signal, sending positions of three position sensors by the three position sensors, wherein the three position sensors are respectively installed close to the first light device, the second light device, and the display device;

generating the two dimming signals by the microcontroller according to the three positions, the two configurations and the multimedia signal.

25. A light control system, comprising:

a power connecting port electrically connecting to an external power source and adapted for providing a power to drive a plurality of light devices;

a first light connecting port adapted for electrically connecting to a first light device;

a second light connecting port adapted for electrically connecting to a second light device;

a camera device taking an observation image and the observation image includes the two light devices and a display screen, wherein the display screen is a display device displaying a video signal transmitted by a host;

a microcontroller electrically connecting to the camera device, wherein the microcontroller is configured to perform an image recognition procedure according to the observation image, wherein the image recognition procedure is configured to obtain positions of the two light devices and the display screen, and the microcontroller further generates two dimming signals according to the two positions and the display screen; and a power distribution unit electrically connecting to the power connecting port, the first light connecting port, the second light connecting port, and the microcontroller, wherein the power distribution unit converts the two dimming signal to two driving signals configured to control the first light device and the second light device to emit colored lights associated with the display screen;

wherein the microcontroller performs a partition color evaluation procedure, wherein the partition color evaluation procedure divides the display screen into one or more sub-screen signals and obtains a representative color of each of the sub-screen signals, each of the sub-screen signals corresponds to a partition of a display screen, and the two dimming signals are associated with two of the representative colors.

26. The light control system according to claim 25, wherein at least one of the first light connecting port and the second light connecting port is USB.

27. The light control system according to claim 25, further comprising a third light connecting port adapted for electrically connecting to the microcontroller and the power distribution unit, wherein the third light connecting port is a digital multiplex interface, and the digital multiplex interface is for electrically connecting a stage light or another light control system.

28. The light control system according to claim 25, wherein the two driving signals are PWM signals or linear current adjusting signals.

29. The light control system according to claim 25, wherein the representative color of each of the sub-screen signals is a mean value of trichromatic light of all pixels in each of the sub-screen signals.

30. A light control method configured to electrically connect a first light device and a second light device of a light control system, with the light control method comprising:

taking an observation image by a camera device of the light control system, wherein the observation image includes the two light devices and a display screen, and the display screen is a display device displaying a video signal transmitted by a host;

performing an image recognition procedure to obtain positions of the two light devices and the display screen by a microcontroller;

after obtaining the display screen by the microcontroller performing the image recognition procedure, dividing the display screen into one or more sub-screen signals by the microcontroller, wherein each of the sub-screen signals corresponds to a partition of a display screen;

obtaining a representative color of each of the sub-screen signals by the microcontroller;

generating two dimming signals by the microcontroller according to two of the representative colors and the two positions;

converting the two dimming signals to two driving signals by a power distribution unit of the light control system; and outputting the two driving signals by a first light connecting port and a second light connecting port of the light control system for controlling the first light device connected by the first light connecting port and the second light device connected by the second light connecting port to emit colored lights associated with the display screen.

31. The light control method according to claim 30, further comprising: when the microcontroller cannot identify the position of any one of the two light devices, selecting a default position as the position of the unidentified light device by the microcontroller.

32. A light control system configured to electrically connect a host and a plurality of light devices, wherein the host electrically connects to a display device, and the display device displays a multimedia signal transmitted by the host, with the light control system comprising:

a power connecting port electrically connecting to an external power source and adapted for providing a power to drive the plurality of light devices;

a host connecting port having a communication connection with the host and adapted for receiving the multimedia signal;

a first light connecting port adapted for electrically connecting to a first light device;

a second light connecting port adapted for electrically connecting to a second light device;

three position sensors respectively installed close to the first light device, the second light device, and the display device, wherein the three position sensors send positions of their own;

a microcontroller electrically connecting to the host connecting port and having communication connections with the three position sensors, wherein the microcontroller is configured to perform a position detecting procedure to obtain the three positions sent by the three position sensors and generate two dimming signals according to the three positions and the multimedia signal; and a power distribution unit electrically connecting to the power connecting port, the first light connecting port, the second light connecting port, and the microcontroller, wherein the power distribution unit converts the two dimming signal to two driving signals configured to control the first light device and the second light device to emit colored lights associated with the multimedia signal;

wherein the multimedia signal is a video signal and the microcontroller is further performs a partition color evaluation procedure, wherein the partition color evaluation procedure divides the video signal into one or more sub-video signals and obtains a representative color of each of the sub-video signals, and each of the sub-video signals corresponds to a partition of a display screen that the video signal is displayed on the display device and the two dimming signals are associated with two of the representative colors.

33. The light control system according to claim 32, wherein at least one of the first light connecting port and the second light connecting port is USB.

34. The light control system according to claim 32, further comprising a third light connecting port adapted for electrically connecting to the microcontroller and the power distribution unit, wherein the third light connecting port is a digital multiplex interface, and the digital multiplex interface is for electrically connecting a stage light or another light control system.

35. The light control system according to claim 32, wherein the two driving signals are PWM signals or linear current adjusting signals.

36. The light control system according to claim 32, wherein the representative color of each of the sub-video signals is a mean value of trichromatic light of all pixels in each of the sub-video signals.

37. The light control system according to claim 32, wherein the multimedia signal is an audio signal, and the microcontroller performs an audio feature recognition procedure, wherein the audio feature recognition procedure generates a plurality of dimming policies according to a volume, a frequency, or a pitch of the audio signal in a time interval and the two dimming signals are associated with the dimming policies.

38. The light control system according to claim 37, further comprising a storage unit electrically connecting to the microcontroller, wherein the storage unit allows the microcontroller to access the dimming policies.

39. The light control system according to claim 32, further comprising an internet communication unit electrically connecting to the microcontroller, wherein the internet communication unit allows the microcontroller to have a communication connection with a cloud server for accessing the dimming policies.

40. The light control system according to claim 32, wherein the multimedia signal comprises a video signal and an audio signal and the microcontroller performs a partition color evaluation procedure and an audio feature recognition procedure, wherein:

the partition color evaluation procedure divides the video signal into one or more sub-video signals and obtains a representative color of each of the sub-video signals, and each of the sub-video signals corresponds to a partition of a display screen that the video signal is displayed on the display device; and the audio feature recognition procedure generates a plurality of dimming policies according to a volume, a frequency, or a pitch of the audio signal in a time interval, and each of the dimming policies comprises a light device number, a specified color and a starting time;

wherein when the representative colors are inconsistent with the specified colors of the dimming policies, the microcontroller further generates the two dimming signals according to the representative colors.

41. The light control system according to claim 32, wherein the multimedia signal comprises a video signal and an audio signal and the microcontroller performs a partition color evaluation procedure and an audio feature recognition procedure, wherein:

the partition color evaluation procedure divides the video signal into one or more sub-video signals and obtains a representative color of each of the sub-video signals, and each of the sub-video signals corresponds to a partition of a display screen that the video signal is displayed on the display device; and the audio feature recognition procedure generates a plurality of dimming policies according to a volume, a frequency, or a pitch of the audio signal in a time interval, and each of the dimming policies comprises a light device number, a specified color and a starting time;

wherein when the representative colors are inconsistent with the specified colors of the dimming policies, the microcontroller further generates the two dimming signals according to the dimming policies.

42. A light control method configured to a first light device and a second light device that electrically connects to a light control system, with the light control method comprising:

performing a position detecting procedure by a microcontroller of the light control system to obtain three positions of three position sensors that are respectively close to the first light device, the second light device and a display device;

receiving a multimedia signal by a host connecting port of the light control system; wherein the multimedia signal is a video signal;

dividing the video signal into one or more sub-video signals by the microcontroller, wherein each of the sub-video signals corresponds to a partition of a display screen that the video signal is displayed on the display device;

obtaining a representative color of each of the sub-video signals by the microcontroller; and generating the two dimming signals by the microcontroller according to two of the representative colors and the three positions;

converting the two dimming signals to two driving signals respectively by a power distribution unit of the light control system; and outputting the two driving signals respectively by a first light connecting port and a second light connecting port of the light control system for controlling the first light device connected by the first light connecting port and the second light device connected by the second light connecting port to emit colored lights associated with the multimedia signal.

43. The light control method according to claim 42, further comprising: when the microcontroller cannot identify the position of any one of the two light devices, selecting a default position as the position of the unidentified light device by the microcontroller.

44. The light control method according to claim 42, further comprising:

when the microcontroller obtaining the representative color of each of the sub-video signals, calculating a mean value of trichromatic light of all pixels in each of the sub-video signals and setting the mean value as the representative color.

45. The light control method according to claim 42, wherein the multimedia signal is an audio signal, with the light control method further comprising:

before the microcontroller generating the two dimming signals, generating a plurality of dimming policies according to a volume, a frequency, or a pitch of the audio signal in a time interval; and generating the two dimming signals according to the dimming policies and the three positions by the microcontroller.

46. The light control method according to claim 45, further comprising:

before the host connecting port of the light control system receiving the multimedia signal, downloading the dimming policies from a cloud server by an internet communication unit of the light control system.

47. The light control method according to claim 42, wherein the multimedia signal comprises a video signal and an audio signal, with the light control method comprising:

before the microcontroller generating the two dimming signals, dividing the video signal into one or more sub-video signals by the microcontroller, wherein each of the sub-video signals corresponds to a partition of a display screen that the video signal is displayed on the display device;

obtaining a representative color of each of the sub-video signals by the microcontroller;

generating a plurality of dimming policies according to a volume, a frequency, or a pitch of the audio signal in a time interval, wherein each of the dimming policies comprises a light device number, a specified color, and a starting time; and generating the two dimming signals according to the representative colors and the three positions when the representative colors are inconsistent with the specified colors of the dimming policies.

48. The light control method according to claim 42, wherein the multimedia signal comprises a video signal and an audio signal, with the light control method comprising:

before the microcontroller generating the two dimming signals, dividing the video signal into one or more sub-video signals by the microcontroller, wherein each of the sub-video signals corresponds to a partition of a display screen that the video signal is displayed on the display device;

obtaining a representative color of each of the sub-video signals by the microcontroller;

generating a plurality of dimming policies according to a volume, a frequency, or a pitch of the audio signal in a time interval, wherein each of the dimming policies comprises a light device number, a specified color, and a starting time; and generating the two dimming signals according to the dimming policies and the three positions when the representative colors are inconsistent with the specified colors of the dimming policies.

* * * * *